(12) United States Patent
Ramzan et al.

(10) Patent No.: US 11,139,982 B2
(45) Date of Patent: Oct. 5, 2021

(54) COMMUNICATION-EFFICIENT DEVICE DELEGATION

(71) Applicant: RSA Security LLC, Bedford, MA (US)

(72) Inventors: Zulfikar A. Ramzan, Saratoga, CA (US); Salah E. Machani, Medford, CA (US)

(73) Assignee: RSA Security LLC, Bedford, MA (US)

( * ) Notice: Subject to any disclaimer, the term of this patent is extended or adjusted under 35 U.S.C. 154(b) by 312 days.

(21) Appl. No.: 16/261,916

(22) Filed: Jan. 30, 2019

(65) Prior Publication Data

US 2020/0244465 A1 Jul. 30, 2020

(51) Int. Cl.
*H04L 9/32* (2006.01)
*H04L 9/08* (2006.01)
*H04L 9/06* (2006.01)
*H04L 9/30* (2006.01)

(52) U.S. Cl.
CPC .......... *H04L 9/3247* (2013.01); *H04L 9/0643* (2013.01); *H04L 9/0819* (2013.01); *H04L 9/30* (2013.01)

(58) Field of Classification Search
None
See application file for complete search history.

(56) References Cited

U.S. PATENT DOCUMENTS

2003/0081785 A1* 5/2003 Boneh ............... H04L 9/0847 380/277
2013/0318632 A1* 11/2013 Keoh ................. H04L 63/0807 726/28
2017/0353308 A1* 12/2017 Reitsma ............. H04L 9/0866
2018/0048462 A1* 2/2018 Salmela .............. H04W 12/37
2019/0229905 A1* 7/2019 Fan ..................... G06F 21/602

OTHER PUBLICATIONS

Michiardi, Pietro et al. "ID-based Hash-Chains for broadcast authentication in wireless networks" [online] Institute Eurecom, Jul. 2004 [retrieved Jan. 29, 2021], URL: https://www.semanticscholar.org/paper/IDHC%3A-ID-based-hash-chains-for-broadcast-in-Michiardi/c4bb53e49f96126f5494b5b1e1aa727666186a8f (Year: 2004).*

(Continued)

*Primary Examiner* — Taghi T Arani
*Assistant Examiner* — Joshua Raymond White
(74) *Attorney, Agent, or Firm* — Danielson Legal LLC (57) ABSTRACT

Techniques are provided for communication-efficient device delegation. One method comprises, in response to a request for a new signing key of a given device, determining a number of new signing key requests received for the user of the given device; determining a new public verification key of the given device for an identity-based signature scheme by traversing a cryptographic hash chain backwards from a position of an initial selected value of the cryptographic hash chain; computing a new signing key based on public parameters and secret parameters of a backup component and the initial selected value; and providing the new public verification key and the new signing key to the given device. The given device authenticates to an authentication service using an identity-based signature computed using the new signing key. The request for the new signing key is submitted, for example, when the given device is lost, damaged, unavailable or stolen.

20 Claims, 8 Drawing Sheets

(56) References Cited

OTHER PUBLICATIONS

Crypto Docs, Crypto Spec: The Keybase Filesystem (KBFS), Version 1.10, 2019, https://keybase.io/docs/crypto/kbfs.
MacKenzie et al. Delegation of Cryptographic Servers for Capture-Resilient Devices, CCS'01, Nov. 5-8, 2001.
Amazon, What If an MFA Device is Lost or Stops Working? AWS Identity and Access Management, 2019 Amazon Web Series, Inc. https://docs.aws.amazon.com/IAM/lastest/UserGuide/id_credentials_mfa_lost-or-broken.html.
GitHub Engineering, New and Improved Two-Factor Lockout Recovery Process, Jan. 30, 2017, https://githubengineering.com/recover-accounts-elsewhere/.

* cited by examiner

310: Select Parameter $N$; Representing Upper Bound on Number of Times Delegation is Expected to Occur.

320: Backup Component 130 Initializes Identity-Based Signature Scheme by Generating Set of Public Parameters *params* and Master Secret $S_{mas}$.

330: Transmit Parameters *params* to User Device 110 and Service 120.

340: Backup Component 130 Selects Seed Value $V_0$ Used to Initialize Cryptographic Hash Chain.

350: From Seed $V_0$, Backup Component 130 Computes Sequence of Values $V_1, V_2, ..., V_N$. (Final Value $V_N$ is Public Verification Key for Identity-Based Signature Scheme (for Public Verification Key $V_N$, let $S_N$ be Corresponding Signing Key).

360: Provide Value $V_N$ to Service 120 and Value $S_N$ to Device 110.

370: Backup Component 130 Stores $V_0$.

510: "New" User Device 110 Requests New Key from Backup Component 130.

520: Backup Component 130 Checks Number of Times ($k$) Backup Component 130 Has Received New Signing Key Request.

530: Backup Component 130 Computes or Retrieves Value $V_{N-k}$.

540: Backup Component 130 Computes Secret Signing Key $S_{N-k}$ Corresponding to $V_{N-k}$.

550: Backup Component 130 Transmits ($k$, $V_{N-k}$, $S_{N-k}$) to New User Device 110.

560: New User Device 110 Uses $S_{N-k}$ as Signing Key (Corresponding Verification Key is $V_{N-k}$).

COMMUNICATION-EFFICIENT DEVICE DELEGATION

FIELD

The field relates generally to information processing systems, and more particularly to authentication techniques in such systems.

BACKGROUND

Many authentication protocols, such as those available from the FIDO (Fast Identity Online) Alliance, involve a challenge-response mechanism. Such mechanisms often involve the use of public-key cryptography, where the device trying to authenticate itself has a private signing key and the service performing the authentication has the corresponding public verification key of the device. If the device in question, however, is lost, stolen or otherwise unavailable, the corresponding key material needs to be replaced in a process that is operationally cumbersome. One known way of addressing the lost device issue is through a technique known as delegation, where a backup system issues a key, together with an assertion (typically signed using the signing key of the backup system), and the device trying to authenticate itself presents a certificate chain as part of a challenge-response protocol. The backup system is typically maintained in one place and, as such, is less likely to be lost, stolen, or damaged.

One drawback of this existing delegation approach is that it effectively requires a certificate chain to be sent as part of the challenge-response protocol, which incurs communication costs and computational costs, and also consumes energy (typically, a limited resource for battery-powered devices). A need therefore exists for techniques for handling device delegation with improved efficiency in terms of communication complexity, time complexity, and/or power consumption.

SUMMARY

In one embodiment, a method performed by a backup component comprises, in response to a request for a new signing key of a given device, determining a number of new signing key requests that have been received for the user of the given device; determining a new public verification key of the given device for an identity-based signature scheme by traversing a cryptographic hash chain comprised of a plurality of hash values, from a position of an initial selected value of the cryptographic hash chain backwards in the cryptographic hash chain based on the number of new signing key requests, wherein the cryptographic hash chain is computed from a seed value construct of the backup component; computing a new signing key of the given device based on one or more public parameters of the backup component, one or more secret parameters of the backup component and the initial selected value; and providing the new public verification key of the given device and the new signing key of the given device to the given device, wherein the given device authenticates to an authentication service for the identity-based signature scheme using an identity-based signature that is computed by the given device using the new signing key, the one or more public parameters of the backup component and an authentication challenge string.

In some embodiments, the given device provides the number of new signing key requests to the authentication service and wherein the authentication service validates the provided number of new signing key requests. In one or more embodiments, the given device provides the new public verification key of the given device to the authentication service and wherein the authentication service validates the new public verification key of the given device by comparing the new public verification key of the given device to at least one prior version of the public verification key of the user of the given device.

The request for the new signing key of the given device is submitted, for example, when the given device is lost, damaged, unavailable or stolen.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for communication-efficient device delegation.

In one or more embodiments, the disclosed device delegation techniques combine identity-based digital signatures with cryptographic hash chains, where each element of the hash chain is treated as a public verification key of an identity-based signature system. In this manner, new keys can be bound to previous keys, thereby enabling a validation of new keys without transmitting an explicit certificate chain (or an equivalent thereof).

Cryptographic Hash Functions Generally, a cryptographic hash function is a mathematical function that can take as input a message of arbitrary length and produces a fixed length output. The cryptographic hash function is designed to have specific properties typically referred to as collision resistance (e.g., it is computationally infeasible to find two distinct inputs that map to the same output) and pre-image resistance (given just an output value, it is computationally infeasible to find any meaningful information about a possible input that maps to the output, let alone the entirety of a possible input itself). In particular, if H is a cryptographic hash function, then given a value y, taken from the range of H, it is hard to find a value x such that y=H(x). Examples of cryptographic hash functions known in the art include SHA-256 (Secure Hash Algorithm-256), HAVAL hash functions, and TIGER hash functions.

Digital Signatures

Generally, a digital signature is a construct that yields a computational analogue of a physical signature. Digital signatures are a mathematical mechanism used to establish the authenticity of a particular digital message and tie the particular digital message to a particular signer. The party that validates a digital signature has a degree of mathematical assurance that the signature was produced (and could only have been produced) by a specific entity (a concept often referred to as authentication). Moreover, digital signatures bind a signer to a given digital message in an essentially inextricable way that cannot be readily denied by the signer (a concept often referred to as non-repudiation). Finally, in relation to these properties, digital signatures also provide a mathematical assurance that the message was not modified after being signed (a concept often referred to as integrity). More specifically, the verifier can detect that the message was modified, typically during the process of signature verification.

A digital signature scheme typically comprises three algorithms, in a known manner:

a key generation algorithm that outputs a private signing key S and a public validation key V. This algorithm is typically designed to be randomized to ensure that each time the key generation algorithm is executed, a different set of keys are produced. The signing key is typically secret while the validation key is known to the public;

a signing algorithm (sig(•, •)) that takes as input a digital message M and the private signing key S, and outputs a digital signature σ=sig(S, M); and a signature verification algorithm (ver(•, •, •)) that takes three inputs: the public validation key V, a message M and a purported digital signature σ corresponding to this message M. The output of the verification algorithm indicates whether or not the signature σ on the message M is considered valid with respect to the validation key V.

Digital signature schemes are designed such that only knowledge of the public key V is required to validate a signature σ on a message M that was purportedly signed using the private signing key S. Furthermore, digital signature schemes are designed so that it is computationally infeasible to forge a signature (that is, a valid signature σ on a message M cannot be generated without knowledge of the signing key S). In other words, knowledge of the signing key S is needed to generate a valid signature. As a byproduct of this requirement, it should be computationally infeasible to derive significant information about the private signing key from the public verification key.

There are many digital signature schemes known in the art, such as the RSA Digital Signature Scheme from Dell EMC of Hopkinton, Mass., and the Digital Signature Algorithm (a Federal Information Processing Standard (FIPS) for digital signatures). See, for example, Burt Kaliski, Jr., RSA Digital Signature Scheme, Encyclopedia of Cryptography and Security, Edited by Henk C. A. van Tilborg and Sushil Jajodia (2011 Edition), incorporated by reference herein in its entirety.

Identity-Based Digital Signatures

One limitation of traditional digital signatures is that the public validation key might have a specific format. For certain applications, however, it is desirable to enable any string to serve as a verification key. One or more aspects of the present disclosure recognize that an identity-based digital signature scheme allows any string to serve as a public verification key. One benefit of identity-based digital signatures is that they simplify the process of explicitly distributing the public verification key. For example, the verification key can be the string corresponding to the email address of a person.

From an operational standpoint, identity-based digital signatures involve a signer and a verifier, and also involve the use of a master component that is responsible for generating keys. In addition, identity-based digital signature schemes typically comprise four algorithms:

a set-up algorithm typically executed by the master component that outputs a set of public parameters params and a master secret $S_{mas}$. The parameters are published, while the master secret is meant to only be known by the master component;

an extract algorithm (extract(•, •, •)) that takes three inputs: the public parameters, the master secret, and a string V that is expected to serve as a public verification key. The extract algorithm generates a private signing key S (that correspond to the public key that was provided as an input);

a signing algorithm (sig(•, •, •)) that functions in a similar manner as the signing procedure described above. The signing algorithm takes as input a digital message M, the private signing key S, and the public parameters params. The signing algorithm outputs a signature σ=sig(S, M, params); and a signature verification algorithm (ver(•, •, •, •)) that functions in a similar manner as the signature verification procedure described above. The signature verification algorithm takes four inputs: the public validation key V, a message M, and a purported digital signature σ corresponding to this message M, and the public parameters params. The output of the verification algorithm indicates whether or not the signature σ on the message M is considered valid with respect to the validation key V and the public parameters params.

Note that the fundamental distinction between identity-based signatures and traditional signatures is that a private signing key can be generated (via the extract algorithm) corresponding to any arbitrary public verification key. In other words, in some embodiments, the public verification key can be any string whatsoever.

The required security properties of identity-based signature schemes are analogous to the required security properties of traditional digital signatures (e.g., it should be computationally infeasible to generate a valid signature on a message without knowledge of secret parameters and keys).

Figure 1:
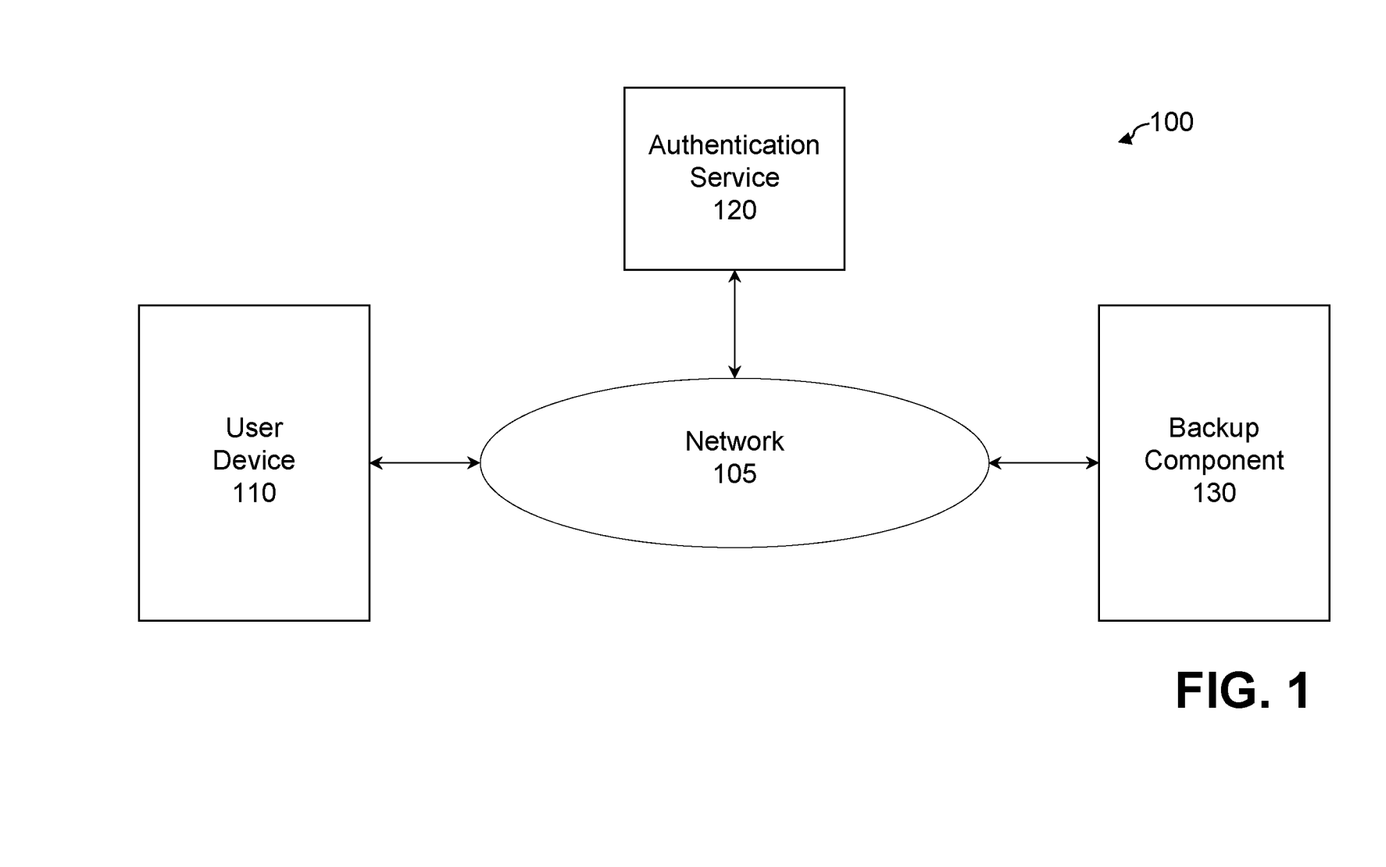
FIG. 1 illustrates a device delegation system 100 according to some embodiments employing three exemplary parties.

Delegation Using Cryptographic Hash Chains and Identity-Based Digital Signatures FIG. 1 illustrates a device delegation system 100 according to some embodiments employing three parties 110, 120, 130. A first party is a user device 110 trying to authenticate itself. A second party is an authentication service 120 that validates the user device 110. A third party is a backup component 130. In one or more embodiments, the backup component 130 issues a validation key comprising a public verification key to the authentication service 120 and a signing key corresponding to the public verification key of the user device 110 to the user device 110. The backup component 130 also issues the corresponding signing key to the user device 110. The user device 110, authentication service 120 and backup component 130 are coupled to a network 105, where the network 105 in this embodiment is assumed to represent a sub-network or other related portion of a larger computer network (e.g., the Internet).

The user device 110 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 110 in some embodiments comprise respective computers associated with a particular company, organization or other enterprise. In addition, at least portions of the computer network 105 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 105 is assumed to comprise a portion of a global computer network such as the Internet, although other types of networks can be part of the network 105, including a wide area network (WAN), a local area network (LAN), a satellite network, a telephone or cable network, a cellular network, a wireless network such as a Wi-Fi or WiMAX network, or various portions or combinations of these and other types of networks. The network 105 in some embodiments therefore comprises combinations of multiple different types of networks, each comprising processing devices configured to communicate using internet protocol (IP) or other related communication protocols.

Figure 2:
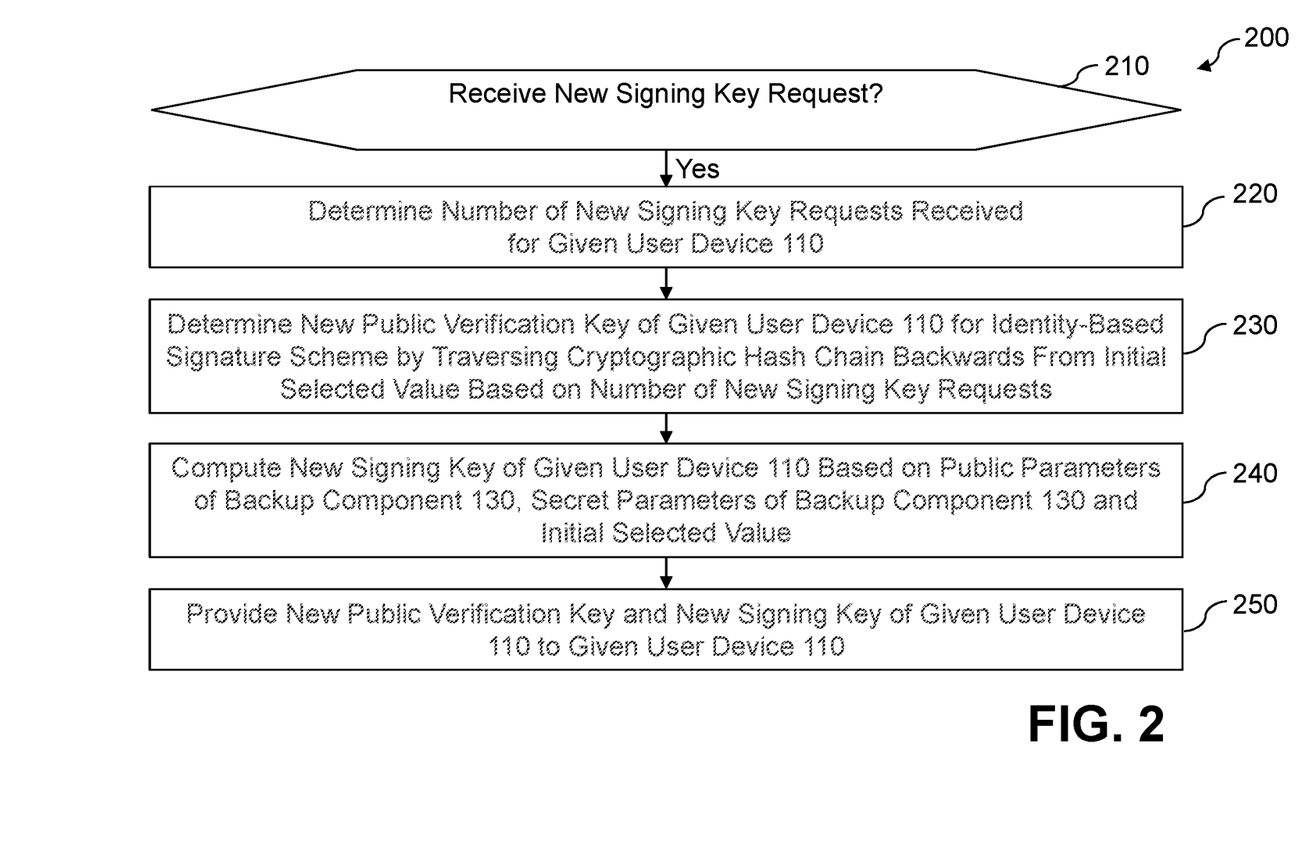
FIG. 2 is a flow chart illustrating an exemplary implementation of a device delegation process, according to one embodiment of the disclosure.

FIG. 2 is a flow chart illustrating an exemplary implementation of a device delegation process 200, according to one embodiment of the disclosure. As shown in FIG. 2, the exemplary device delegation process 200 initially performs a test during step 210 to determine if a request is received for a new signing key of a given user device 110. Once it is determined during step 210 that a new signing key request is received, the exemplary device delegation process 200 determines a number of new signing key requests that have been received for the given user device 110 during step 220.

The exemplary device delegation process 200 then determines a new public verification key of the given user device 110 during step 230 for an identity-based signature scheme by traversing a cryptographic hash chain comprised of a plurality of hash values, from a position of an initial selected value of the cryptographic hash chain backwards in the cryptographic hash chain based on the number of new signing key requests. The cryptographic hash chain is computed from a seed value construct of the backup component 130.

A new signing key of the given user device 110 is computed during step 240 based on one or more public parameters of the backup component 130, one or more secret parameters of the backup component 130 and the initial selected value. Finally, the new public verification key of the given user device 110 and the new signing key of the given user device 110 are provided to the given user device 110 during step 250. The given user device 110 eventually authenticates to an authentication service 120 for the identity-based signature scheme using an identity-based signature that is computed by the given user device 110 using the new signing key, the one or more public parameters of the backup component 130 and an authentication string.

In some embodiments of the disclosed communication-efficient delegation mechanism, the parties 110, 120, 130 of FIG. 1 engage in the following protocols.

Initialization Protocol

Figure 3:
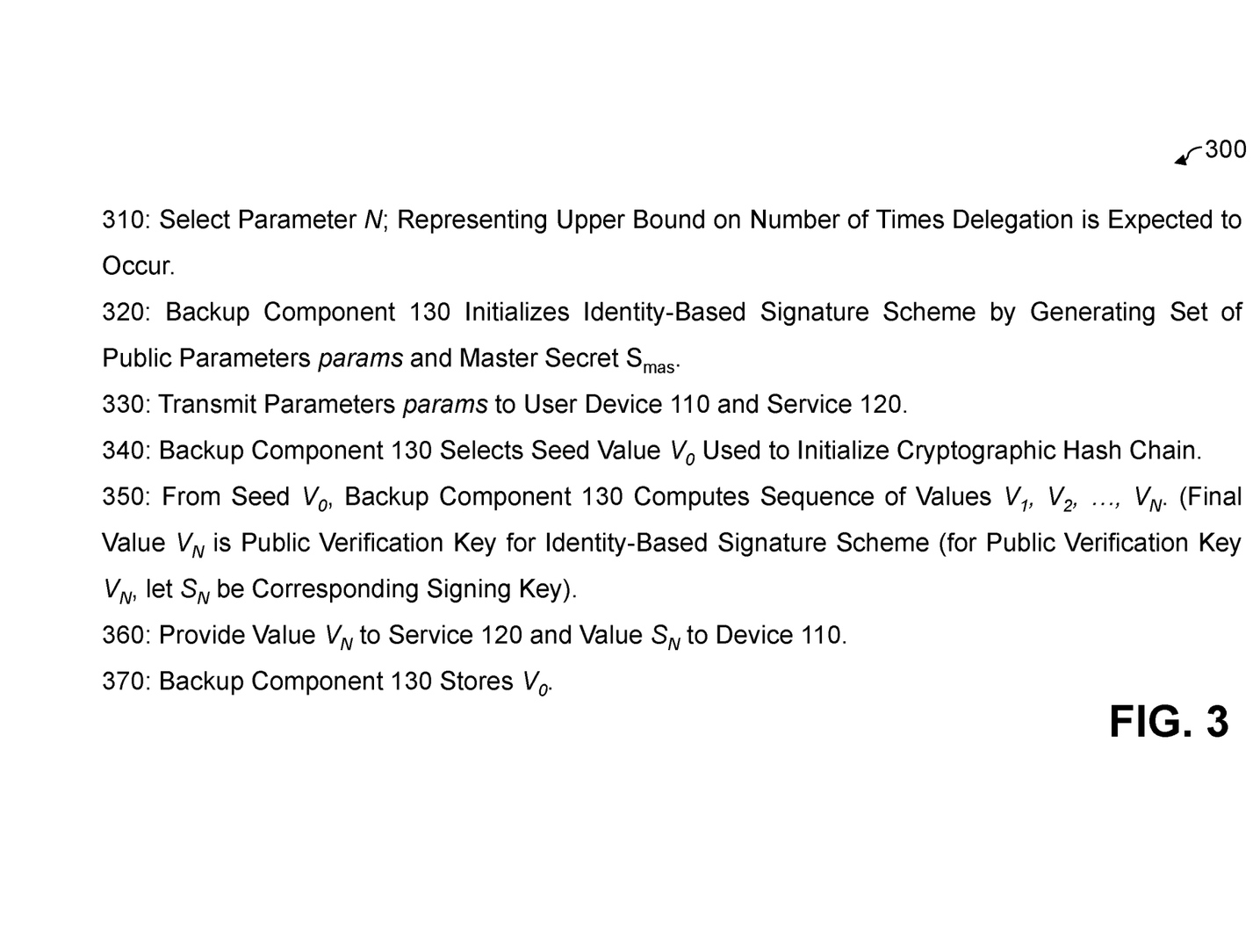
FIG. 3 illustrates exemplary pseudo code for an initialization process, according to some embodiments of the disclosure.

FIG. 3 illustrates exemplary pseudo code for an initialization process 300, according to one embodiment of the disclosure. Generally, the exemplary initialization process 300 sets up initial keys in the device delegation system 100 of FIG. 1. The initialization process 300 is performed prior to a device delegation, for example, during an enrollment, and might need to be performed occasionally thereafter (e.g., if the device delegation system 100 is being reinitialized for any reason). In general, initialization is performed infrequently. In the example of FIG. 3, the initialization process 300 works as follows:

1. Select parameter N during step 310; this parameter represents an upper bound on the number of times delegation is expected to occur (e.g., an upper bound on the number of times a device is expected to be, for example, lost, damaged, unavailable or stolen during the lifetime of this account).

2. Backup component 130 initializes an identity-based signature scheme during step 320 by generating a set of public parameters params and a master secret $S_{mas}$. The public parameters are published, while the master secret is meant to only be known by the backup component 130.

3. The public parameters params are transmitted to both the user device 110 and the authentication service 120 during step 330.

4. The backup component 130 selects a seed value $V_0$ during step 340 that will be used to initialize a cryptographic hash chain. This value is chosen at random from a string of suitable length (e.g., 356 bits).

5. From the seed $V_0$, the backup component 130 computes a sequence of values $V_1, V_2, \ldots, V_N$ during step 350, as follows: $V_1=H(V_0)$, $V_2=H(V_1)$, and so on. In general, $V_i=H(V_{i-1})$ for $1<=i<=N$. The final value $V_N$ is treated as a public verification key for an identity-based signature scheme (recall that in an identity-based signature scheme, virtually any string can serve as a public verification key). For this public verification key $V_N$, let $S_N$ be the corresponding signing key as generated by the identity-based signature scheme; in particular, $S_N$=extract(params, $S_{mas}$, $V_N$).

6. The value $V_N$ is provided to the authentication service 120 and the value $S_N$ is provided to the user device 110 during step 360.

7. The backup component 130 stores the value $V_0$ during step 370 (optionally, storing any or all of the values $V_1, V_2, \ldots, V_N$, but note that storing these values is not necessary since they can be computed from $V_0$ (e.g., storing these values in advance offers a tradeoff between storage and time)).

As used herein, a request for a new signing key is submitted by the user device 110 in response to one or more of a user device 110 being lost, damaged, stolen or otherwise being unavailable. It is noted that the parameters transmitted during step 330 could alternatively be transmitted at a later time, as would be apparent to a person of ordinary skill in the art.

In one or more embodiments, a cryptographic hash chain is employed for device delegation, where elements in the cryptographic hash chain serve as a validation key in an identity-based signature scheme. It is noted that identity-based signatures are used in some embodiments since they enable virtually any string to become a public validation key (in this particular case, there is limited control over the values in the hash chain).

Challenge-Response Protocol

Figure 4:
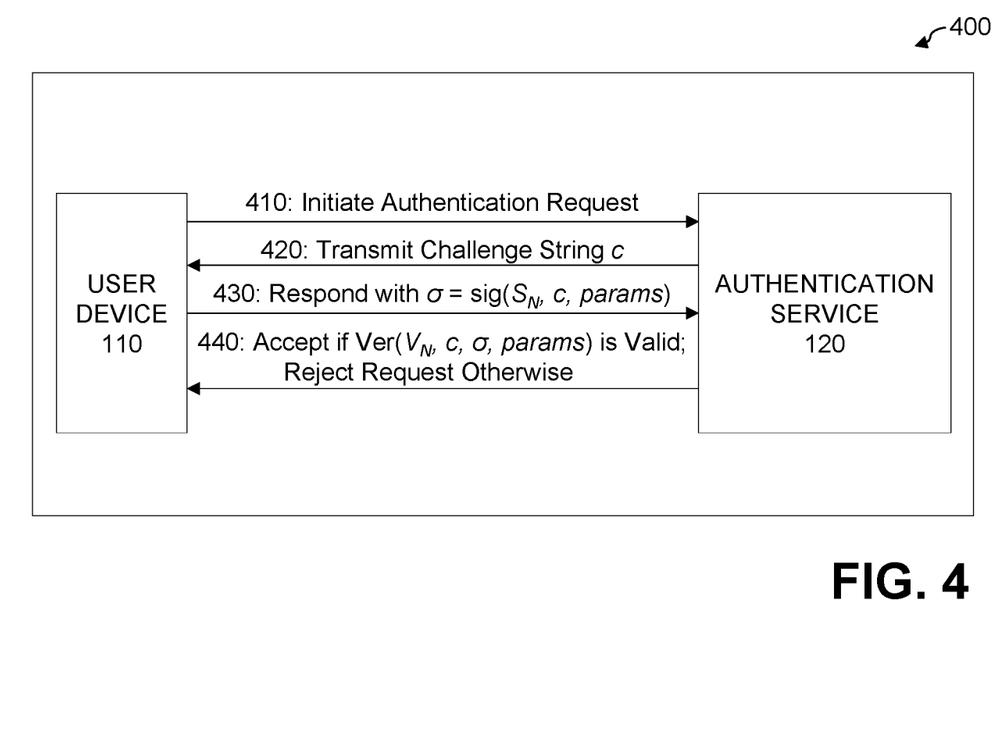
FIG. 4 illustrates a communication diagram between the user device and the authentication service of FIG. 1 for a challenge-response protocol, according to one or more embodiments.

FIG. 4 illustrates a communication diagram 400 between the user device 110 and the authentication service 120 of FIG. 1 for a challenge-response protocol, according to some embodiments. Generally, the challenge-response phase of FIG. 4 occurs whenever the user device 110 tries to authenticate itself with the authentication service 120. The challenge-response phase is expected to happen frequently. The challenge-response protocol, between the user device 110 and the authentication service 120, comprises the following exemplary steps, as shown in FIG. 4:

1. The user device 110 initiates an authentication request to the authentication service 120 during step 410 to authenticate itself (there are many methods in the art for forming such a request—the most salient aspect is that the request comprises a device identifier so that the service knows which device is trying to authenticate itself).

2. The authentication service 120 selects a challenge string c and transmits the challenge string c to the user device 110 during step 420 (the mechanism by which this is done is orthogonal to the remainder of the present disclosure and there are numerous known methods, as would be apparent to a person of ordinary skill in the art).

3. The user device 110 uses its knowledge of the (secret) signing key $S_N$ and computes the identity-based signature $\sigma = \text{sig}(S_N, c, \text{params})$, and transmits the signature $\sigma$ to the authentication service 120 during step 430.

4. The authentication service 120 performs validation $\text{Ver}(V_N, c, \sigma, \text{params})$ of the signature $\sigma$ using knowledge of the validation key $V_N$. If the signature $\sigma$ on the challenge c is deemed valid with respect to the key $V_N$, then the authentication service 120 accepts the response $\sigma$ to the challenge c during step 440 and approves the authentication request of the user device 110. Otherwise, the request is rejected.

New Signing Key Request Protocol

Figure 5:
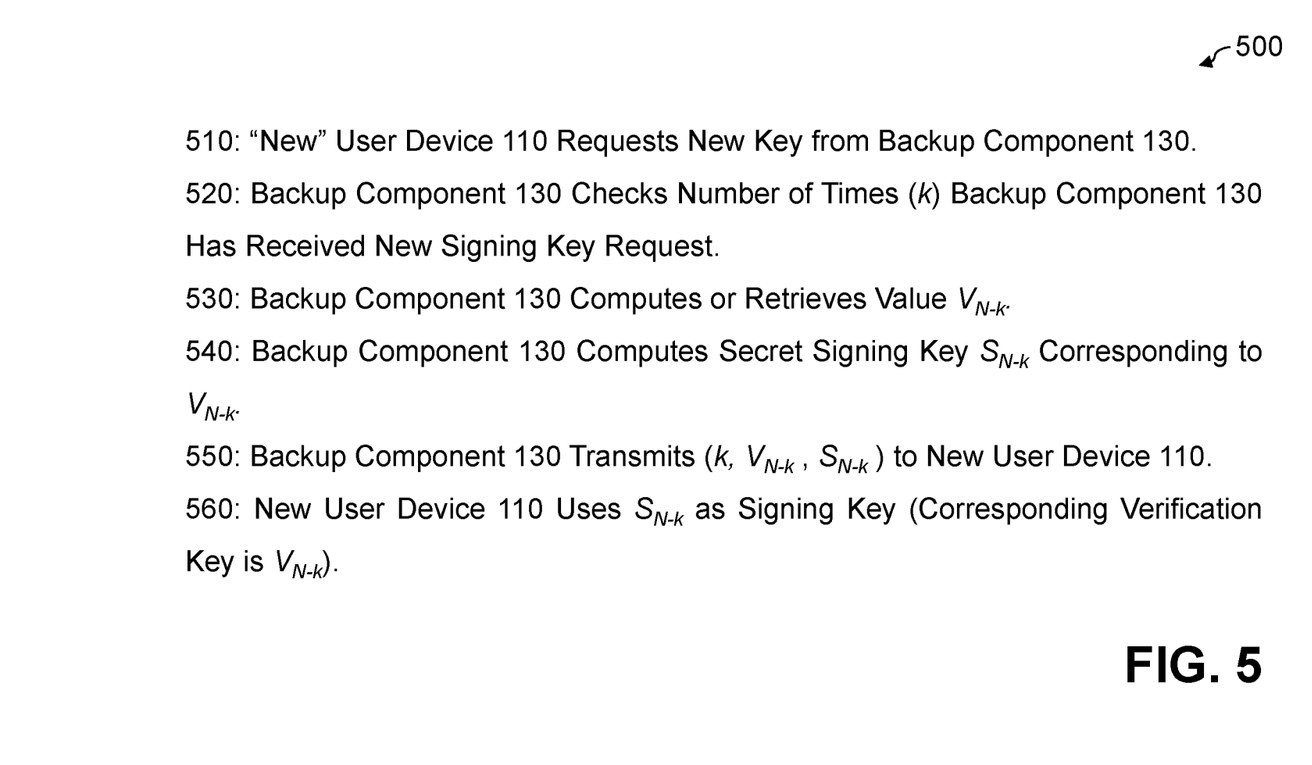
FIG. 5 illustrates exemplary pseudo code for a new signing key request process, according to an embodiment of the disclosure.

FIG. 5 illustrates exemplary pseudo code for a new signing key request process 500, according to one embodiment of the disclosure. Generally, the exemplary new signing key request process 500 processes a request for a new signing key when the user device 110 is, for example, lost, damaged or stolen (e.g., when the owner purchases or otherwise obtains a new user device 110). The loss, damage or theft of the user device 110 is expected to happen infrequently. A new signing key is needed by the new user device 110 since the old signing key might have been compromised. In the example of FIG. 5, the new signing key request process 500 works as follows:

1. The "new" user device 110 requests a new key from the backup component 130 during step 510.

2. The backup component 130 checks how many times the backup component 130 has received a new signing key request during step 520. This number will be denoted by k (i.e., a given user device 110 has been lost k times).

3. The backup component 130 either computes or retrieves the value $V_{N-k}$ during step 530. (The value can be computed from $V_0$ which the backup component 130 stored earlier.)

4. The backup component 130 computes the secret signing key $S_{N-k}$ corresponding to the value $V_{N-k}$ during step 540.

5. The backup component 130 transmits the value of k, and the new secret signing key $S_{N-k}$ corresponding to the value $V_{N-k}$ to the new user device 110 during step 550.

6. The new user device 110 now treats the new secret signing key $S_{N-k}$ as its signing key during step 560 (to which the corresponding verification key is $V_{N-k}$).

It is noted that if k equals one (e.g., the user device 110 is only stolen once) then the new verification key is $V_{N-1}$ (and the corresponding signing key is $S_{N-1}$). In other words, the chain has been traversed "backwards" by one step. Note also that by the security properties of cryptographic hash functions, no one other than the backup component 130 can compute $V_{N-k}$. The backup component 130 can perform this computation because $V_0$ is known and the backup component 130 can compute the remaining values by going forward in the chain. (Otherwise, it is computationally infeasible to traverse backwards from $V_N$ to $V_{N-k}$ for any value of k>0 without any other knowledge).

In some embodiments, the chain is constructed by selecting a (secret) seed value, and iteratively applying a hash function to it. The values generated at each iteration comprise the "chain." From a security perspective, it is easy to go forward in the chain (i.e., given a particular value in the chain, one inputs the particular value into the hash function—and the output is the next value). However, if one uses a cryptographically strong hash function, it is believed to be computationally infeasible to go backwards. In other words, given a particular value in the chain, it would take an astronomical amount of time to identify the value preceding the particular value (i.e., given an output of a hash function, it is considered hard to find what the input value would have been).

It is recognized that values of k in the hash chain can be skipped in some embodiments. If the entity transmitting the values indicates how many values were skipped, the verifier can ignore those values. However, even if the transmitter omits the information about how many values are skipped, the verifier can still try each value. For example, values in the hash chain could be skipped as long as the new value is within an acceptable range by the authentication service 120.

Updated Challenge-Response Protocol

Figure 6:
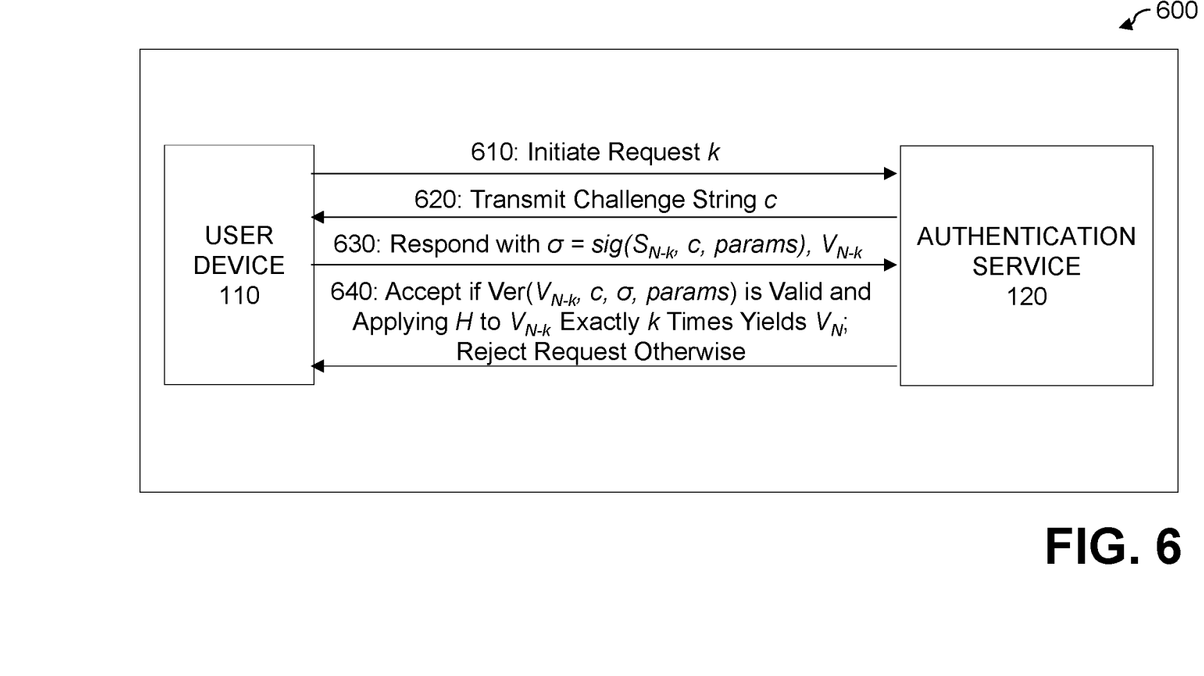
FIG. 6 illustrates a communication diagram between the user device and the authentication service of FIG. 1 for an updated challenge-response protocol, according to some embodiments.

FIG. 6 illustrates a communication diagram 600 between the user device 110 and the authentication service 120 of FIG. 1 for an updated challenge-response protocol, according to some embodiments. Generally, the updated challenge-response phase of FIG. 6 occurs whenever the user device 110 wishes to authenticate itself using a new signing key with the authentication service 120. In the case of FIG. 6, the new user device 110 has to provide a new key to the authentication service 120 and the authentication service 120 needs to check that the new key could only have been provided to the new user device 110 by the backup component 130. The updated challenge-response phase of FIG. 6 is expected to happen frequently. The updated challenge-response protocol between the user device 110 and the authentication service 120, comprises the following exemplary steps, shown in FIG. 6:

1. The new user device 110 initiates a request to the authentication service 120 during step 610 to authenticate itself using a new key and indicates the value k (representing how many times the user device 110 has changed in the past; e.g., if k=1, a device has been lost, damaged or stolen only once).

2. The authentication service 120 notes the value k and validates the value k (e.g., ensures that k is in the expected range and that k has not somehow decreased from prior use). The authentication service 120 selects a challenge string c and transmits the selected challenge string c to the user device 110 during step 620 (the mechanism by which this is done is orthogonal to the remainder of the present disclosure and there are numerous known methods, as would be apparent to a person of ordinary skill in the art (in some embodiments, one requirement is that the challenge string is fresh (e.g., has not been used before)).

3. The user device 110 uses its knowledge of the (secret) signing key $S_{N-k}$ and computes the identity-based signature $\sigma=sig(S_{N-k}, c, params)$ during step 630. The user device 110 transmits the signature $\sigma$ to the authentication service 120 together with the new verification key $V_{N-k}$ during step 630.

4. The authentication service 120 validates the verification $V_{N\_k}$ by computing $V_N$ from the verification $V_{N\_k}$ and comparing the computed $V_N$ to the original version of $V_N$ known by the authentication service 120. Note that the authentication service 120 can compute $V_N$ from $V_{N\_k}$ because doing so requires computing the cryptographic hash in the forward direction (e.g., by applying H to $V_{N-k}$ a total of k times to arrive at $V_N$). If this computation fails for any reason (e.g., a value other than $V_N$ is ultimately derived), then the service can deny the authentication request during step 640. The authentication service 120 then performs validation $Ver(V_{N-k}, c, \sigma, params)$ of the signature $\sigma$ using knowledge of the validation key $V_{N-k}$. If the signature $\sigma$ on the challenge c is deemed valid with respect to the key $V_{N-k}$, then the authentication service 120 accepts the response a to the challenge c during step 640 and the authentication service 120 approves the authentication request of the user device 110.

The authentication service 120 then optionally updates its record of the validation key for the device to $V_{N\_k}$.

It is recognized that in some embodiments, the value k can be omitted for the exemplary challenge-response protocols, although the challenge-response protocols are more efficient if the value k is provided. For a first execution of a challenge-response protocol, for example, the value k can be assumed to be one. For subsequent executions of the challenge-response protocol, the authentication service 120 can determine the value of k and determine that k is within an acceptable range without explicitly getting the value from the user device 110.

After execution of the updated challenge-response protocol of FIG. 6, for this new user device 110, the parties can revert back to using the basic challenge-response protocol of FIG. 3, but with the revised key $V_{N\_k}$. Essentially, in future instances of the challenge-response protocol, the user device 110 no longer has to transmit k since the service would already know the value of k from an earlier instance. Note that in some embodiments the update itself is efficient from a communication standpoint. The user device 110 only provides an updated key. The authentication service 120 can validate this key by computing a hash chain. By the security properties of cryptographic hash functions, it is computationally infeasible for anyone to compute a pre-image in the chain without knowledge of one of the values $V_0, V_1, \ldots, V_{N-k-1}$. Since the original seed value $V_0$ is supposed to be kept secret on the backup component 130, the authentication service 120 has an assurance that the user device 110 only received the new key from this backup component 130.

Among other benefits, the disclosed device delegation techniques employ the updated challenge-response protocol of FIG. 5 by providing a single extra hash value during the challenge-response phase. The canonical delegation method, on the other hand, incurs extra communication.

As a further optional optimization, the user device 110 does not need to transmit the value k to the service explicitly. Instead, the authentication service 120 can compute the value k by taking the verification key received from the user device 110 and hashing the value k until it matches the original verification key received during registration. The number of hashes required is then k. Note that if the user device 110 transmits an invalid or incorrect verification key, the authentication service 120 will know after N hash attempts (where N represents the upper bound on the number of times delegation is expected to occur).

Multi-Credential Devices

Single factor and multi-factor cryptographic authenticators, such as FIDO authenticators, are generally multi-credential devices. Credentials are unique per user device 110 and per authentication service 120. If a given user device 110 is lost, damaged or stolen, for example, all of the credentials in that given user device 110 will be lost and considered compromised. The same device delegation techniques described above can be used to replace lost credentials across all authentication services 120.

Canonical Device Delegation Approach

As noted above, the canonical approach for device delegation involves the use of public-key cryptography and certificate chains. In this context, the backup component can generally be thought of as a certificate authority. Generally, a certificate authority is an entity that can bind public keys with other attributes in a verifiable way. During registration, the backup component provides the device with a private signing key SD and the service with a public verification key $V_D$—both keys are associated with the device (much like the device delegation techniques described herein). In addition, the backup component provides the service with second public verification key $V_B$ that is associated with the backup component. The backup component keeps the signing key $S_B$ and does not share that with any other parties.

To authenticate, the standard challenge-response paradigm is observed. In particular, the device initiates an authentication request, the service transmits a challenge string to the device, and the device responds to the challenge by digitally signing the challenge string using the signing key SD and transmitting the resulting signature to the service. The service can validate the response using its knowledge of the verification key $V_D$.

If the device is lost, damaged or stolen, the backup component issues a new signing key $S_{ND}$ to the new device (the subscript ND is meant to denote a new device). In addition, the backup component provides the verification key $V_{ND}$ to the new device together with a signature $\sigma=sig(S_B, V_{ND})$. In other words, the backup device signs the new device's verification key.

During the challenge-response phase, the new device will make an authentication request to the service. The service will transmit a challenge C. The new device will sign the challenge $\sigma c=sig(S_{ND}, C)$ using its new signing key. In addition, the new device will transmit its new public verification key $V_{ND}$ as well as the signature $\sigma$ that it received from the backup component (recall that this value $\sigma$ is the signature of the new device's verification key by the signing key of the backup component).

The service can then validate the signature $\sigma$ using its knowledge of $V_B$ (which was transmitted during the initial registration) and can further validate σc using the public verification key $V_{ND}$ that was transmitted during the response phase.

While the canonical approach requires communicating three pieces of information (the signature on the challenge σc; the new verification key of the new device $V_{ND}$; and the signature σ provided by the backup component), the disclosed device delegation techniques transmit the signature on the challenge σc; and the new verification key $V_{N-k}$.

In other words, in one or more embodiments, the disclosed device delegation techniques obviate the need to send the second signature (and any accompanying information). Note that this second signature is effectively a certificate or assertion of the validity of the public key $V_{ND}$. Even if it is assumed that the signatures and verification keys have the same length, the result is a 33% reduction in communication complexity. In practice, however, the savings can be even greater. In particular, in some embodiments, a cryptographic hash function whose output size is 16-bytes (128 bits) provides more than adequate security for this application. It is noted that for this use case, the pre-image resistance of the cryptographic hash function is of interest, and not the collision resistance of the cryptographic hash function. As a result, a smaller output length can be used (e.g., 128-bits) since the security of the function will be proportional to the output length. If collision resistance was the primary concern, the output length would have to be double to account for certain attack scenarios. Again, the disclosed device delegation techniques rely on pre-image resistance. Thus, a smaller output size can be used without compromising security If an identity-based signature scheme was used, whose security was based on certain assumptions, then the output of such a scheme might be 2048 bits to achieve adequate security levels. In this case, the canonical approach uses 6,144 bits and the disclosed device delegation approach uses 2176 bits (e.g., a nearly 65% reduction in communication in some embodiments).

One or more embodiments of the present disclosure assume that the value of k is not transmitted explicitly. If the value of k was transmitted, however, then the additional overhead is minimal (e.g., if it is assumed that the number of times a user device 110 of a particular user is lost, damaged or stolen is bounded by 255 bits, for example, then the overhead of sending k is at most one additional byte).

One or more aspects of the disclosure recognize that when authentication tokens are lost or stolen, for example, it is important achieve performance efficiencies in these delegation scenarios. Reducing communication complexity has a number of benefits. For example, mobile devices may be bandwidth constrained. Reducing how many bits are transmitted leads to higher efficiency and reliability. In addition, communication complexity is directly tied to power consumption. Communicating a single bit of information outside of a user device 110 expends considerable power (typically, about 1,000 times the cost of performing a single basic arithmetic instruction on the user device 110). Therefore, reducing communication complexity also reduces the power consumed during the protocol. This consideration is particularly important since advances in battery capacity have been much slower than the Moore's law type advances in computational capability.

In some embodiments, the disclosed device delegation techniques exhibit improved efficiency in terms of communication complexity, time complexity, and/or power consumption.

One or more embodiments of the disclosure provide improved methods, apparatus and computer program products for device delegation. The foregoing applications and associated embodiments should be considered as illustrative only, and numerous other embodiments can be configured using the techniques disclosed herein, in a wide variety of different applications.

It should also be understood that the disclosed device delegation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for device delegation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based device delegation system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based device delegation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
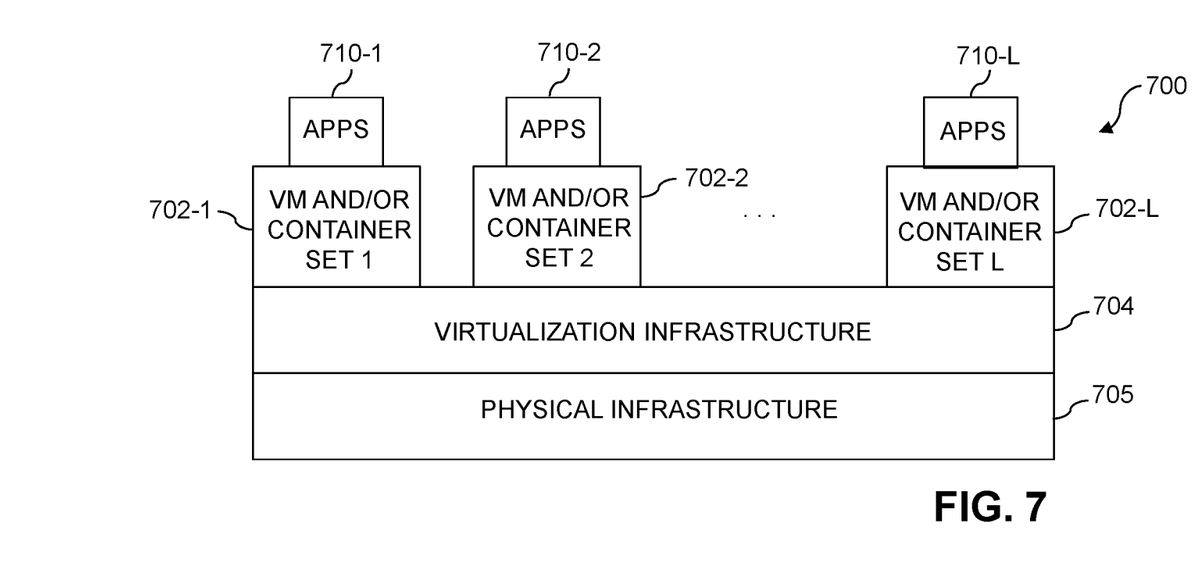
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the device delegation system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide device delegation functionality of the type described above for one or more processes running on a given one of the VMs. For example, each of the VMs can implement device delegation control logic and associated key replacement functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide device delegation functionality of the type described above for one or more processes running on different ones of the containers. For example, a container host device supporting multiple containers of one or more container sets can implement one or more instances of device delegation control logic and associated key replacement functionality for use in replacing lost, damager or otherwise unavailable user devices 110.

As is apparent from the above, one or more of the processing modules or other components of device delegation system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
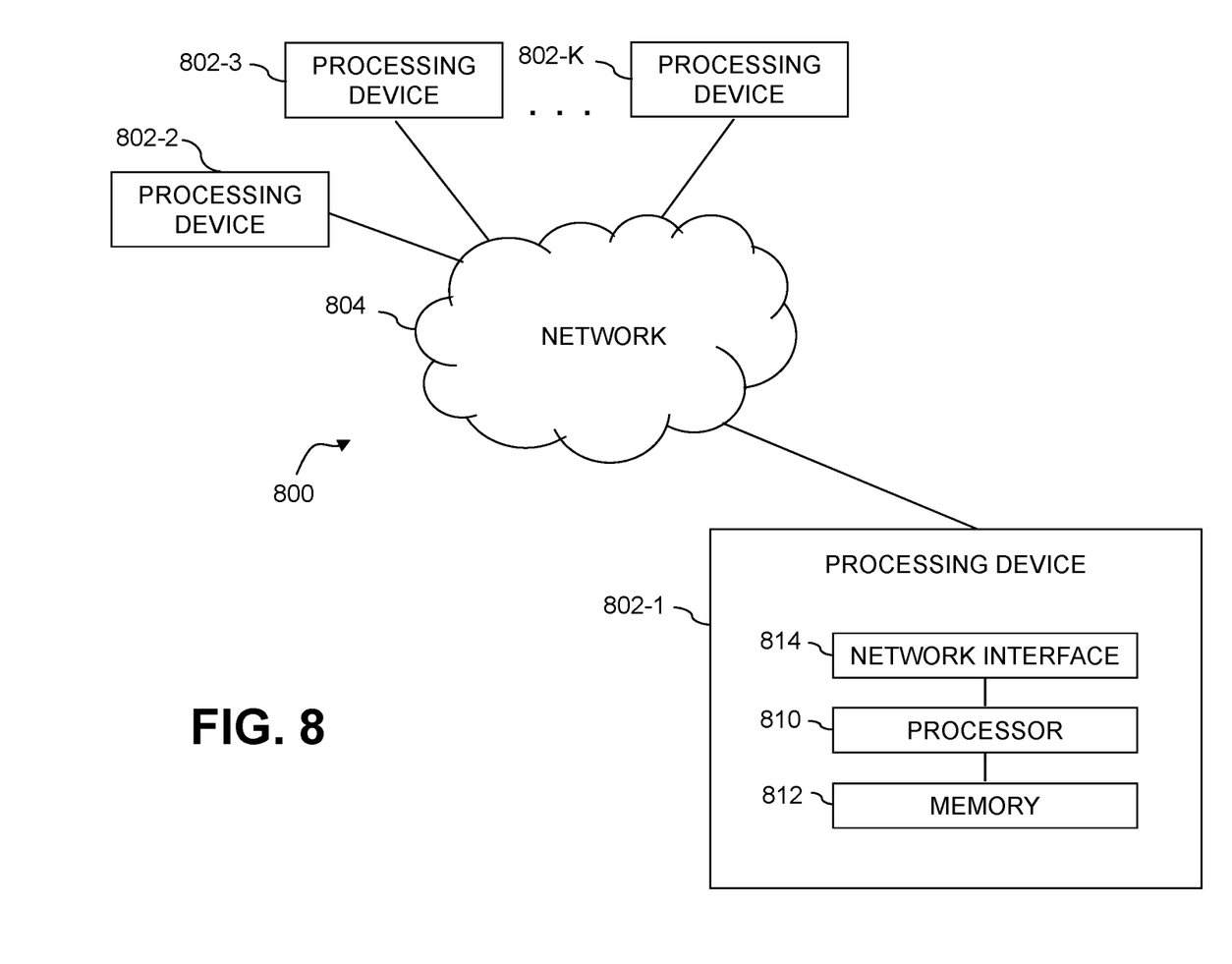
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines.

Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
in response to a request for a new signing key of a given device, at least one processing device of a backup component performs the following steps:
determining a number of new signing key requests that have been received for a user of the given device;
determining a new public verification key of the given device for an identity-based signature scheme by traversing a cryptographic hash chain comprised of a plurality of hash values, from a position of an initial selected value of the cryptographic hash chain backwards in the cryptographic hash chain based on the number of new signing key requests, wherein the cryptographic hash chain is computed from a seed value construct of the backup component and is traversed by skipping a number of hash values of the chain to determine the new public verification key;
computing a new signing key of the given device based on one or more public parameters of the backup component, one or more secret parameters of the backup component, the number of hash values of the chain to be skipped, and the initial selected value; and
providing the new public verification key of the given device and the new signing key of the given device to the given device, wherein the given device authenticates to an authentication service for the identity-based signature scheme using an identity-based signature that is computed by the given device using the new signing key, the one or more public parameters of the backup component and an authentication challenge string.

2. The method of claim 1, further comprising a step of the backup component providing the number of new signing key requests to the given device.

3. The method of claim 1, wherein the given device provides the number of new signing key requests to the authentication service and wherein the authentication service validates the provided number of new signing key requests.

4. The method of claim 1, wherein the given device provides the new public verification key of the given device to the authentication service and wherein the authentication service validates the new public verification key of the given device by comparing the new public verification key of the given device to at least one prior version of the public verification key of the user of the given device.

5. The method of claim 4, wherein the authentication service validates the new public verification key of the given device, the one or more public parameters of the backup component and the authentication challenge string using the new public verification key of the given device.

6. The method of claim 4, wherein the authentication service authenticates the given device upon validating the new public verification key of the given device.

7. The method of claim 1, wherein the request for the new signing key of the given device is submitted when the given device is one or more of lost, damaged, unavailable and stolen.

8. A system, comprising:
a memory; and
at least one processing device, coupled to the memory, operative to implement the following steps: in response to a request for a new signing key of a given device, a backup component performs the following steps:
determining a number of new signing key requests that have been received for a user of the given device;
determining a new public verification key of the given device for an identity-based signature scheme by traversing a cryptographic hash chain comprised of a plurality of hash values, from a position of an initial selected value of the cryptographic hash chain backwards in the cryptographic hash chain based on the number of new signing key requests, wherein the cryptographic hash chain is computed from a seed value construct of the backup component and is traversed by skipping a number of hash values of the chain to determine the new public verification key;
computing a new signing key of the given device based on one or more public parameters of the backup component, one or more secret parameters of the backup component, the number of hash values of the chain to be skipped, and the initial selected value; and
providing the new public verification key of the given device and the new signing key of the given device to the given device, wherein the given device authenticates to an authentication service for the identity-based signature scheme using an identity-based signature that is computed by the given device using the new signing key, the one or more public parameters of the backup component and an authentication challenge string.

9. The system of claim 8, further comprising a step of the backup component providing the number of new signing key requests to the given device.

10. The system of claim 8, wherein the given device provides the number of new signing key requests to the authentication service and wherein the authentication service validates the provided number of new signing key requests.

11. The system of claim 8, wherein the given device provides the new public verification key of the given device to the authentication service and wherein the authentication service validates the new public verification key of the given device by comparing the new public verification key of the given device to at least one prior version of the public verification key of the user of the given device.

12. The system of claim 11, wherein the authentication service validates the new public verification key of the given device, the one or more public parameters of the backup component and the authentication challenge string using the new public verification key of the given device.

13. The system of claim 11, wherein the authentication service authenticates the given device upon validating the new public verification key of the given device.

14. The system of claim 8, wherein the request for the new signing key of the given device is submitted when the given device is one or more of lost, damaged, unavailable and stolen.

15. A computer program product, comprising a tangible machine-readable storage medium having encoded therein executable code of one or more software programs, wherein the one or more software programs when executed by at least one processing device perform the following steps:
   in response to a request for a new signing key of a given device, a backup component performs the following steps:
   determining a number of new signing key requests that have been received for a user of the given device;
   determining a new public verification key of the given device for an identity-based signature scheme by traversing a cryptographic hash chain comprised of a plurality of hash values, from a position of an initial selected value of the cryptographic hash chain backwards in the cryptographic hash chain based on the number of new signing key requests, wherein the cryptographic hash chain is computed from a seed value construct of the backup component and is traversed by skipping a number of hash values of the chain to determine the new public verification key;
   computing a new signing key of the given device based on one or more public parameters of the backup component, one or more secret parameters of the backup component, the number of hash values of the chain to be skipped, and the initial selected value; and
   providing the new public verification key of the given device and the new signing key of the given device to the given device, wherein the given device authenticates to an authentication service for the identity-based signature scheme using an identity-based signature that is computed by the given device using the new signing key, the one or more public parameters of the backup component and an authentication challenge string.

16. The computer program product of claim 15, further comprising a step of the backup component providing the number of new signing key requests to the given device.

17. The computer program product of claim 15, wherein the given device provides the number of new signing key requests to the authentication service and wherein the authentication service validates the provided number of new signing key requests.

18. The computer program product of claim 15, wherein the given device provides the new public verification key of the given device to the authentication service and wherein the authentication service validates the new public verification key of the given device by comparing the new public verification key of the given device to at least one prior version of the public verification key of the user of the given device.

19. The computer program product of claim 18, wherein the authentication service validates the new public verification key of the given device, the one or more public parameters of the backup component and the authentication challenge string using the new public verification key of the given device, and authenticates the given device upon validating the new public verification key of the given device.

20. The computer program product of claim 15, wherein the request for the new signing key of the given device is submitted when the given device is one or more of lost, damaged, unavailable and stolen.

* * * * *